Oct. 30, 1962  H. O. OLSON  3,061,018
SPRING-LOADED COULTER DISC
Filed April 26, 1960  2 Sheets-Sheet 1
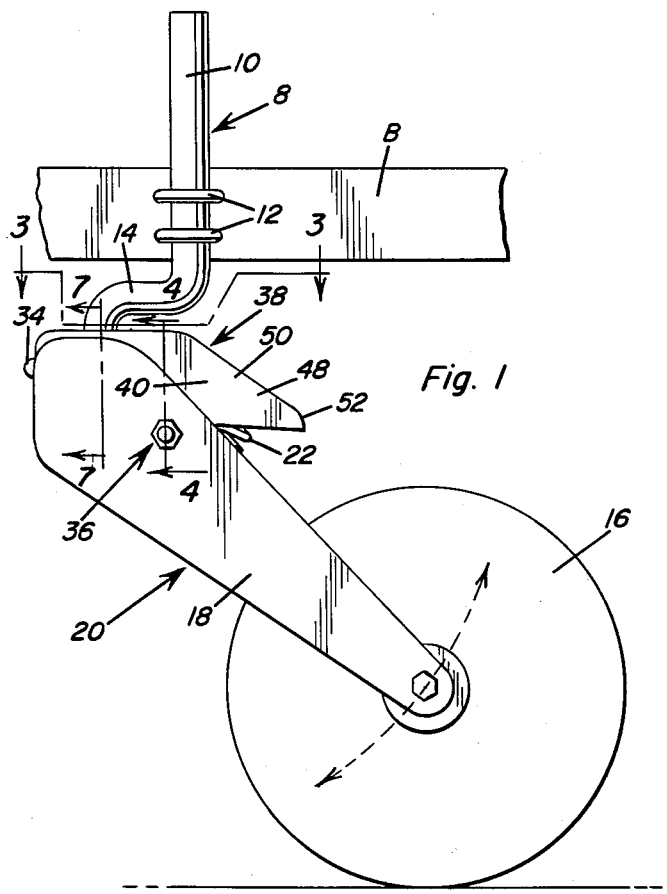
Fig. 1
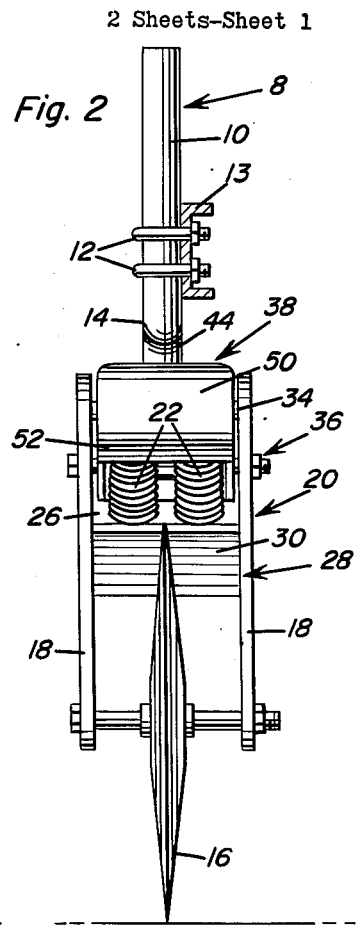
Fig. 2
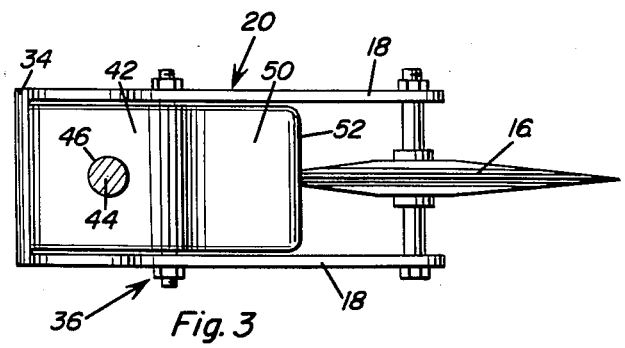
Fig. 3
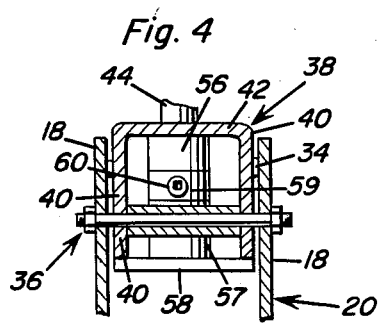
Fig. 4
Fig. 7
Howard O. Olson
INVENTOR.
BY *Clarence A.O'Brien*
*and Harvey B. Jacobson*
Attorneys Oct. 30, 1962   H. O. OLSON   3,061,018
SPRING-LOADED COULTER DISC
Filed April 26, 1960   2 Sheets-Sheet 2

Howard O. Olson
INVENTOR.

United States Patent Office 3,061,018
Patented Oct. 30, 1962

3,061,018
SPRING-LOADED COULTER DISC
Howard O. Olson, Fillmore, N. Dak.
(407 W. Pine, Junction City, Kans.)
Filed Apr. 26, 1960, Ser. No. 24,811
4 Claims. (Cl. 172—139)

The present invention relates to certain new and useful improvements in a spring-biased rolling coulter for currently used high speed plows.

An object of the invention is to so improve the coulter that it will more successfully cut through trash, roots and stubble in a manner to aid the associated plow to perform a cleaner more acceptable job, to minimize clogging of the plow, and to virtually overcome the necessity of repeatedly stopping, as is usually done, to clear a clogged plow.

Since clean plowing invariably results in the production of better crops, it is a constant aim of those working in this line of endeavor to adopt and use whatever improved equipment is feasible and practical looking toward acceptable non-stop plowing results. Since coulters are virtually necessary under most plowing conditions, much attention is being given to better trash clearance with coulters whether of the flat disc, concavo-convex disc, notched, or single or double disc-type. Looking toward reducing malfunctioning and promoting maximum endurance, it is an objective in the instant endeavor to yieldingly mount the coulter disc on the lower crank end of the conventional type adjustably mounted shank. In carrying out the principles of the instant invention, the suspension or supporting shank for the coulter is bracketed in place on the plow beam by clevises in the usual way so that, so far as the shank is concerned, it may be adjusted vertically and the crank end thereof switched from side to side. In other words, there are no changes in the shank and mode of attaching and supporting it.

Another purpose of the instant invention in the interest of increased economy, greater convenience, and better performance of the associated plow is to enable the coulter disc to cope with rocks and other relatively stationary obstacles by accommodating itself, in a limited but wholly reliable manner, to the condition and minimizing the likelihood of breakage of the disc or associated component parts by way of which it is mounted on the beam. With the instant construction the coulter is able to penetrate, cut trash and leave a more satisfactory surface for plowing.

Briefly summarized, the concept is reduced to practice through the medium of the aforementioned crank-type shank, a coulter disc, a fork or yoke the arms of which rotatably support the disc, and said arms being hingedly mounted to swing in a vertical plane on a horizontal axis and spring-biasing means being provided to function as the desired spring-loaded hinged joint between the fork and crank end of the shank.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in side elevation of a coulter constructed in accordance with the invention showing how it is constructed and mounted;

FIG. 2 is a view of the same observing it in a direction from right to left;

FIG. 3 is a horizontal sectional view on the line 3—3 of FIG. 1;

FIG. 4 is a section on the line 4—4 of FIG. 3;

FIG. 7 is a section on the line 7—7 of FIG. 1.

In the following description the spring means may be and preferably is characterized by at least two coil springs; but, for simplification of language, a single spring (FIG. 6) will be set forth explicitly.

Figure 5:
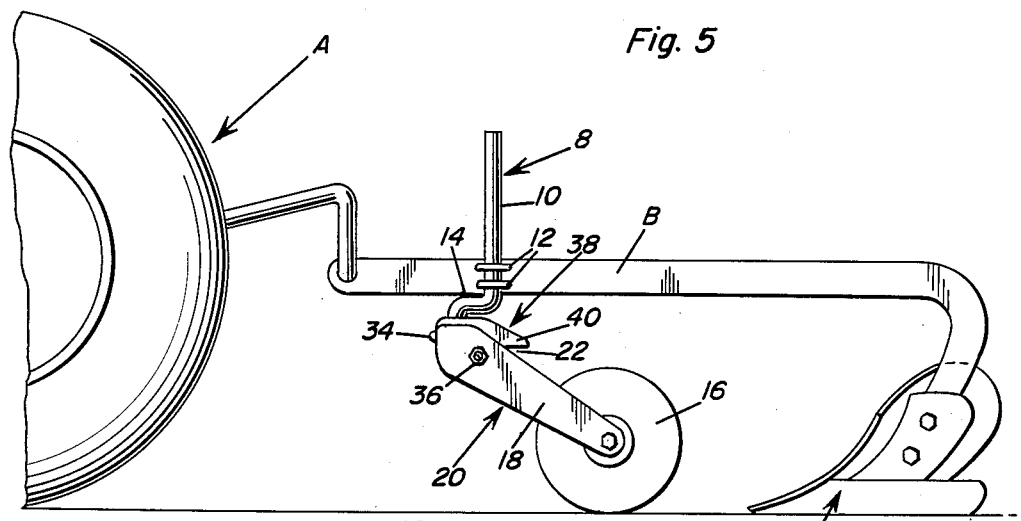
FIG. 5 is a view on a smaller scale showing the plow beam, the plow and the improved coulter construction on the beam.

With reference first to FIG. 5, the letter A designates a tractor or other pull vehicle, B the beam and C the moldboard plow.

The invention has to do with the improved coulter. Some of the parts in this coulter combination are, of course, old and therefore well known but it is the combination which is the product here which is capable of producing the improved and desirable result.

Figure 6:
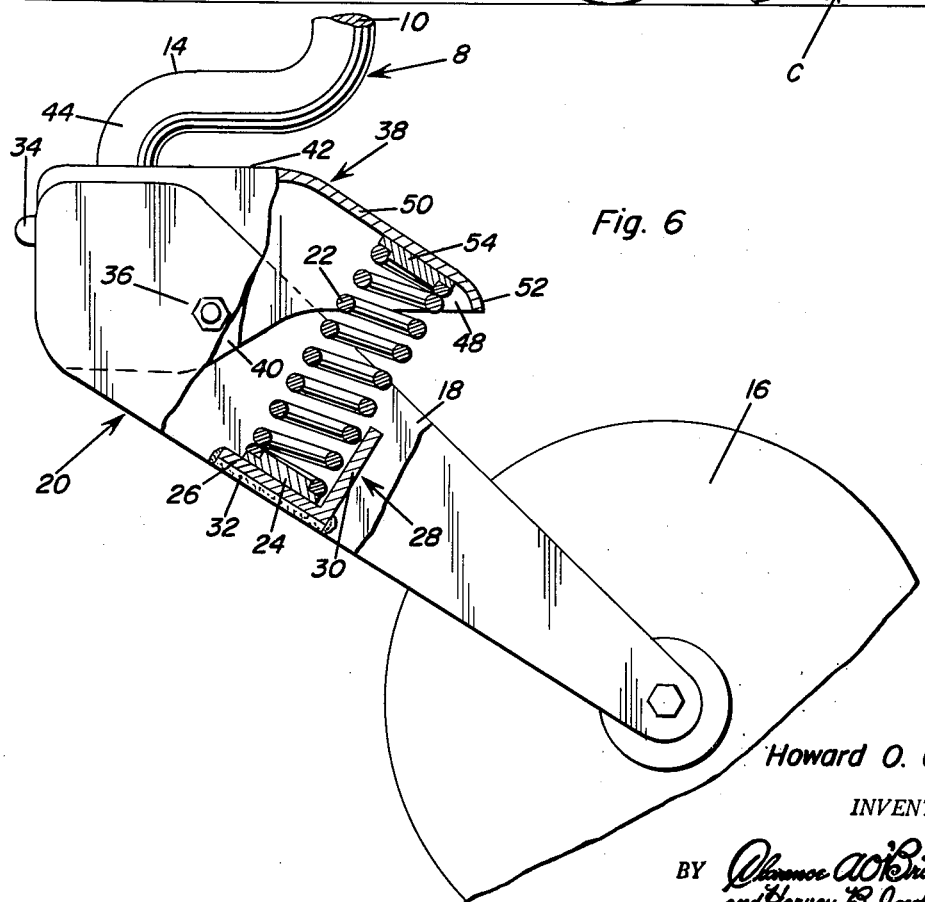
FIG. 6 is a view on an enlarged scale which serves effectively to bring out the improved spring-loaded hinge joint connection between the cooperating component parts.

The mounting, generally referred to by the numeral 8 in FIG. 5, comprises the usual attachable and detachable vertically disposed rigid shank 10, the same being adjustably and removably mounted on the plow beam B by way of customary clevises or clamps 12. The usual lateral crank portion 14 is disposed, of course, below the plane of the beam. The coulter disc is denoted at 16 and as before stated, this disc may be of any suitable type, that is, of the form herein shown, or may be flat-faced, concave or perhaps of a dual type (not shown) and either with or without a jointer (not shown). In other words, the parts 8 to 16 are individually old. When combined and united in the manner shown in FIG. 6, the over-all coulter is an improved device. To accomplish this desirable improved result the coulter disc is mounted rotatably and removably in any suitable manner between the spaced parallel arms 18 on the specially proportioned and constructed fork or yoke 20. Mounted on a median portion and spanning the space between the yoke arms is a fixed foundation for a suitably gauged coil expansion spring 22. The lower convolution of the spring is seated on an anchor provided therefor at 24 which, in turn, is fixed atop one flange 26 of a generally horizontal angle iron fixture or bar 28. The vertical flange 30 thereof is located as illustrated in FIG. 6. The angle iron may be welded or otherwise fixed between the arms as at 32. The left hand end portions of the arms are connected together by a rigidifying limit stop bar or brace 34. These arms straddle and are hingedly mounted on bolt means 36 carried by the special adapter bracket 38. This bracket is, more specifically, in the nature of an elongated inverted or open-bottom box-like housing of generally inverted U-shaped cross-section and comprising spaced parallel side walls or flanges 40 depending from a top wall or bight portion 42 which top wall has the lower end portion 44 of the shank 8 swivelly cooperable therewith, as at 46. The walls 40 fit between the arms of the yoke or fork and these walls are gradually reduced in height, forming a sort of a skirt at the right hand end portion 48. The top or web is inclined downwardly at an oblique angle, as at 50, and terminates in a curved lip 52. This lip portion is provided with an anchor 54 to accommodate the upper convolution or coil of the spring. These paired anchors 24 and 54 are of button-like form and are mounted in axial alignment to position and properly retain the side-by-side coil springs, said springs providing the desired spring-biasing and shock-absorbing means for the yoke-equipped disc 16. As before mentioned two springs 22 may be and are generally used, as shown.

Novel means is utilized in providing a supporting and swivelling joint or connection between the depending vertical portion 44 of the shank 8 and the adapter bracket 38. The means is shown to advantage in FIGS. 4 and 7. With respect to these illustrations it will be evident that the top wall or web is provided with a hole for the depending portion 45 (FIG. 7) and is further provided on its underneath side with a depending bearing or guide sleeve 56 which is aligned with a cooperating socket member or bearing 57 supported on a cross-bar member 58 spanning the walls or flanges 40. A collar 57 is aligned with and interposed between the component socket members 56 and 57 and it embraces the crank portion 45 and is secured thereto by a setscrew 60. With this assemblage and cooperation between the parts it will be evident that the spring-loaded hinge joint means is swivelly attached to and suspended from the shank 8 and the shank 8 is adjustably bracketed on the beam. It follows that all of the component parts perform a cooperating share in achieving an over-all practical and improved result.

This construction provides positive down pressure for the upwardly yielding fork and disc member. It follows that with this construction the improved plowing capacity enables the driver to keep moving ahead and insures better trash clearance all along the line. Since plowing is one of the most costly jobs necessary in raising crops, also a slow job too, any saving in plowing and anything which helps to speed up results makes a noticeable difference and effects final costs, profits and aids in labor saving difficulties. This construction is expressly designed for rocky land and when plowing on land with heavy straw strewn thereon. This over-all improved coulter replaces the original stationary coulter.

It is reiterated that a main advantage of this improved construction is the shock absorbing spring-biasing action which is attainable and which allows the disc to cut the ground ahead of the plow share and yet relieve the pressure applied to it while in the ground. The spring allows the coulter to move back up when it strikes a solid object. Another advantage of this construction is that it has considerably more clearance for straw and other accumulations ahead of the plow share due to the 6-inch rise of the front portion of the yoke arms. In addition to the upward and slightly backward automatic movement of the coulter it will be seen that, insofar as the mounting shank is concerned, this improved coulter is adjustable as any other type in the field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A coulter construction comprising a shank adapted for vertical disposition and adapted to be adjustably and detachably mounted on a plow beam, said shank having a crank portion at a lower end thereof, a freely rotatable adapter bracket removably and swivelly mounted on said crank portion and disposed in a plane at right angles to the axis of said crank portion, a coulter disc, a fork having arms straddling the disc at corresponding ends of the arms, said disc being mounted for free rotation between said arms, the ends of the arms adjacent to said adapter bracket straddling the adapter bracket and being hingedly mounted thereon, and coil spring means interposed between the adapter bracket and anchoring means provided therefor on said arms, said adapter bracket comprising axially aligned spaced apart socket members and a collar embracing the crank portion, said crank portion being rotatable in said socket members and the collar being interposed between adjacent cooperating ends of the socket members, the lower socket member being supported on a cross-bar provided at an open bottom portion of the adapter bracket.

2. A rolling coulter comprising, in combination, a vertical shank for mounting on a plow beam, an adapter bracket freely rotatable in a horizontal plane on the lower end portion of said shank, a rearwardly and downwardly inclined fork pivotally mounted for swinging movement in a vertical plane on said bracket, a vertical disc journaled in said fork, means for yieldingly resisting upward swinging movement of the fork, and means for positively limiting downward swinging movement of said fork, said bracket being generally inverted U-shaped and including an apertured bight portion journaled on the shank and comprising a rearwardly and downwardly inclined extension, the first-named means comprising an angle bar mounted transversely in the fork at an intermediate point and in opposed relation to said extension, pairs of opposed spring seats on the angle bar and the extension, and coil springs mounted on said seats, said fork including spaced arms having one end portion straddling the bracket and pivotally secured thereon, the last-named means comprising a transverse bar connecting the pivoted ends of the arms and engageable with the bracket.

3. A rolling coulter comprising a vertical shank for mounting on a plow beam, and adapter bracket rotatable in a horizontal plane on the lower end portion of said shank, said bracket being generally inverted U-shaped and including a bight portion having an opening therein rotatably receiving the shank, said bracket further including opposed side flanges depending from said bight portion, a bar extending between said flanges and engaged with the lower end of the shank, a pair of spaced bearings on the bar and the bight portion aligned with the opening and journaled on the shank, a collar fixed on the shank between the bearings, a fork pivotally mounted for vertical swinging movement on the bracket, and a vertical disc journaled in said fork.

4. A rolling coulter in accordance with claim 3, wherein said fork includes a pair of spaced, parallel arms having one end portion straddling the bracket and pivotally connected thereto, and a bar connecting the pivoted ends of the arms and engageable with the bracket for positively limiting downward swinging movement of the fork.

References Cited in the file of this patent

UNITED STATES PATENTS

| | | |
|---|---|---|
| 1,273,898 | Melvin et al. | July 30, 1918 |
| 1,425,451 | Conti | Aug. 8, 1922 |
| 2,087,299 | Pribil | July 20, 1937 |
| 2,738,542 | Clark | Mar. 20, 1956 |
| 2,753,946 | Quayle | July 10, 1956 |

FOREIGN PATENTS

| | | |
|---|---|---|
| 1,112,584 | France | Mar. 15, 1956 |